United States Patent

Rawal et al.

[11] Patent Number: 6,046,816
[45] Date of Patent: Apr. 4, 2000

[54] PRINT DATA FLOW OPERATION STANDARDIZED TEST TECHNIQUE

[75] Inventors: Deepak D. Rawal; Leonardo Riener, both of Fremont, Calif.

[73] Assignee: Adobe Systems Incorporated, San Jose, Calif.

[21] Appl. No.: 08/886,521

[22] Filed: Jul. 1, 1997

[51] Int. Cl.[7] .................................................. G06F 3/12
[52] U.S. Cl. ..................... 358/1.12; 358/1.01; 358/1.02; 358/1.13; 358/1.14; 358/1.12; 345/966; 345/967; 702/176; 702/177; 702/178; 702/186; 364/468.15; 364/940.1
[58] Field of Search .................................. 395/101, 102, 395/113, 114, 112; 345/966–967; 702/176–178; 186; 364/940.1, 468.15

[56] References Cited

FOREIGN PATENT DOCUMENTS 8-137636  5/1996  Japan .................................... 702/186

OTHER PUBLICATIONS

"Benchmarking," Test Plan for Monochrome PrintGear, Adobe, pp. 1, 13–14, Dec. 2, 1996.
The Seybold Report on Desktop Publishing, p. 33, Jul. 17, 1995.
Zenographics Corp. "Introducing SuperPrint" manual, p. 35, Jun. 26, 1996.

*Primary Examiner*—Mark R. Powell
*Assistant Examiner*—Lance W. Sealey
*Attorney, Agent, or Firm*—Fish & Richardson P.C.

[57] ABSTRACT

System for measuring the total amount of time elapsed during a computer print job, also known as the "click to clunk" time. The amount of time spent by the computer processing data before it is sent to the printer and the amount of time spent by the printer printing the document are measured, providing a measure of the total time the user waits until printing is completed, measured from the time the user makes a print request. The amount of time during which the application is unavailable to the user during print spooling is measured. Print job time measurements may be displayed on screen, printed, or saved to a file.

17 Claims, 4 Drawing Sheets

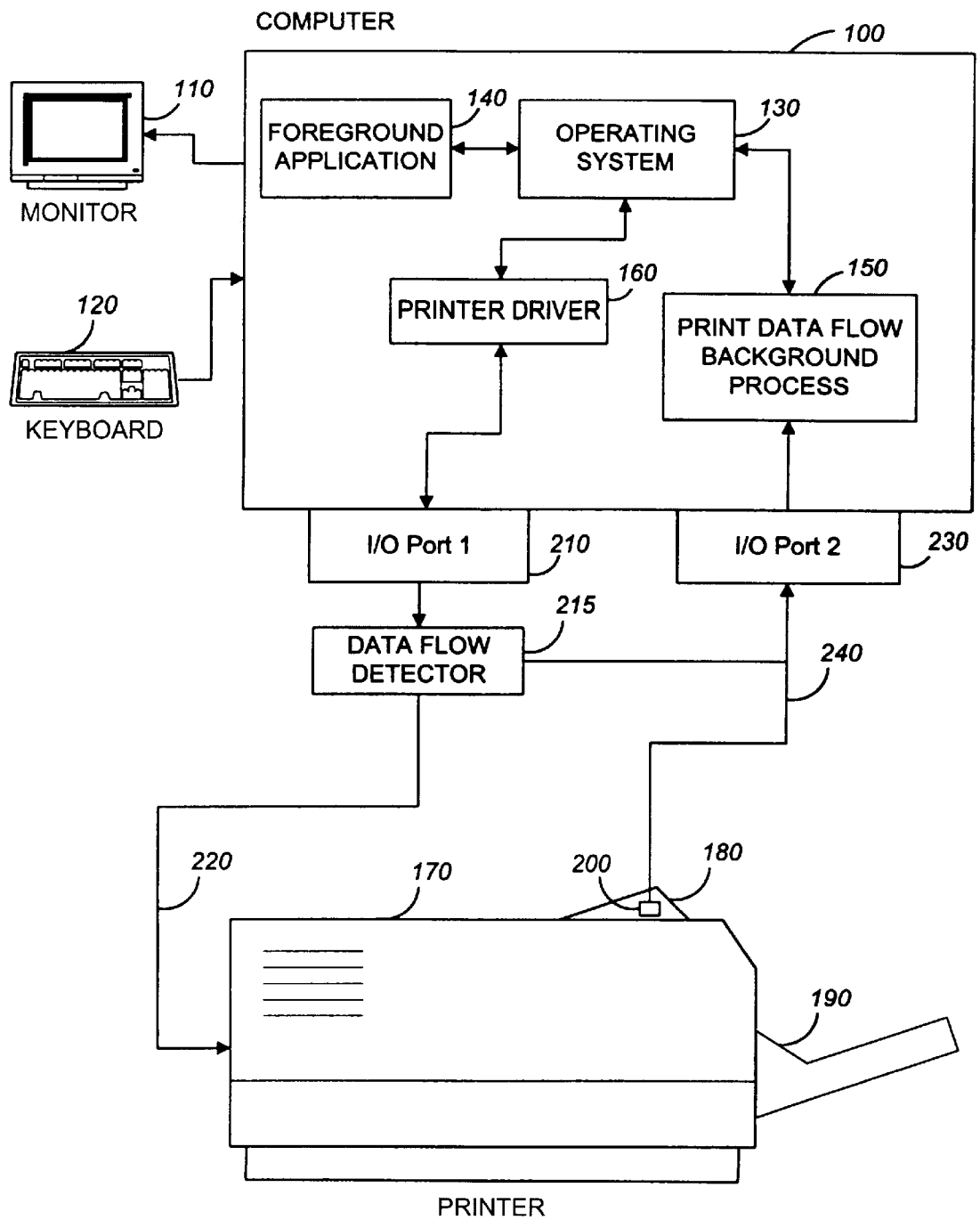
FIG._1

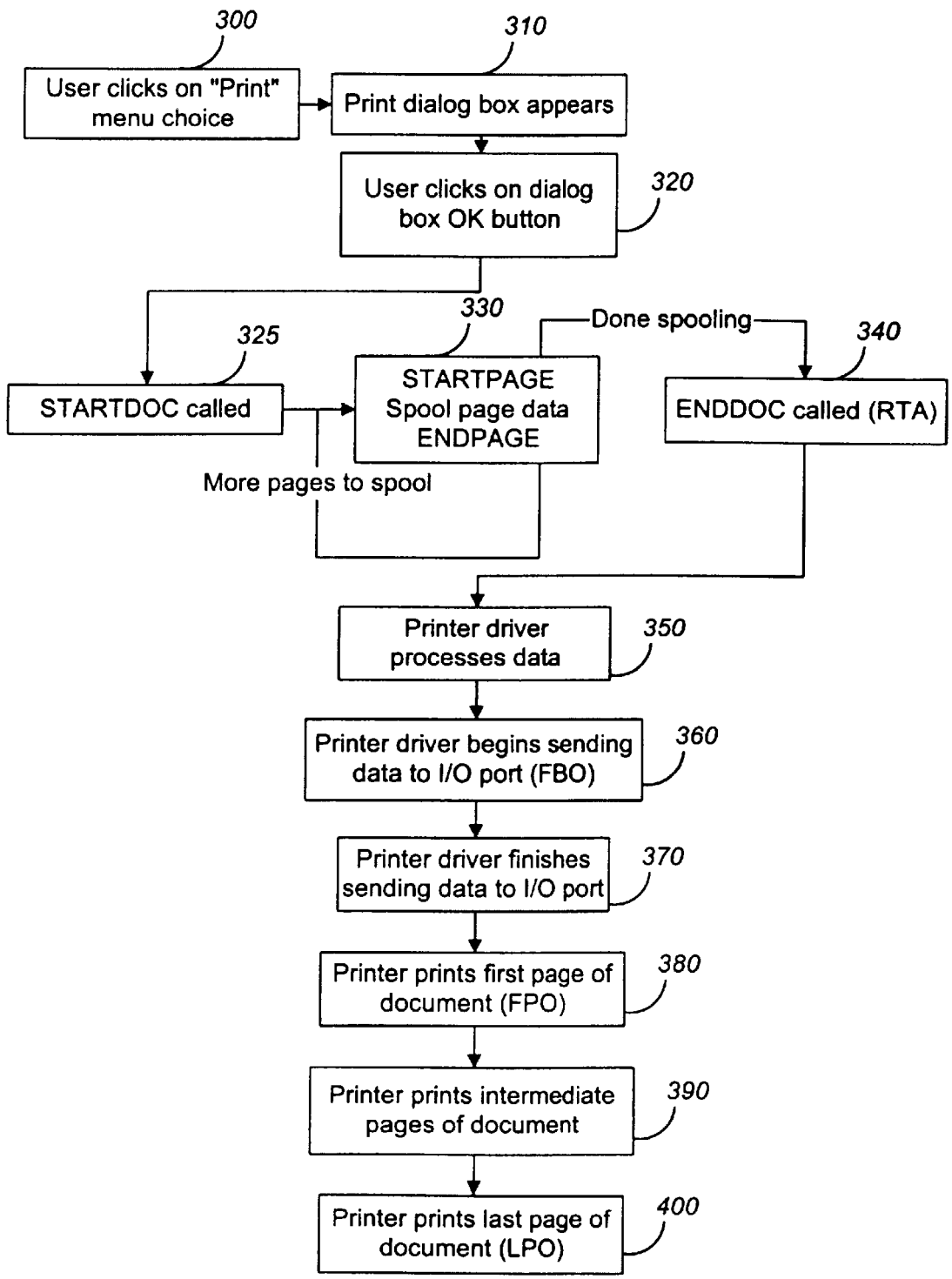
FIG._2

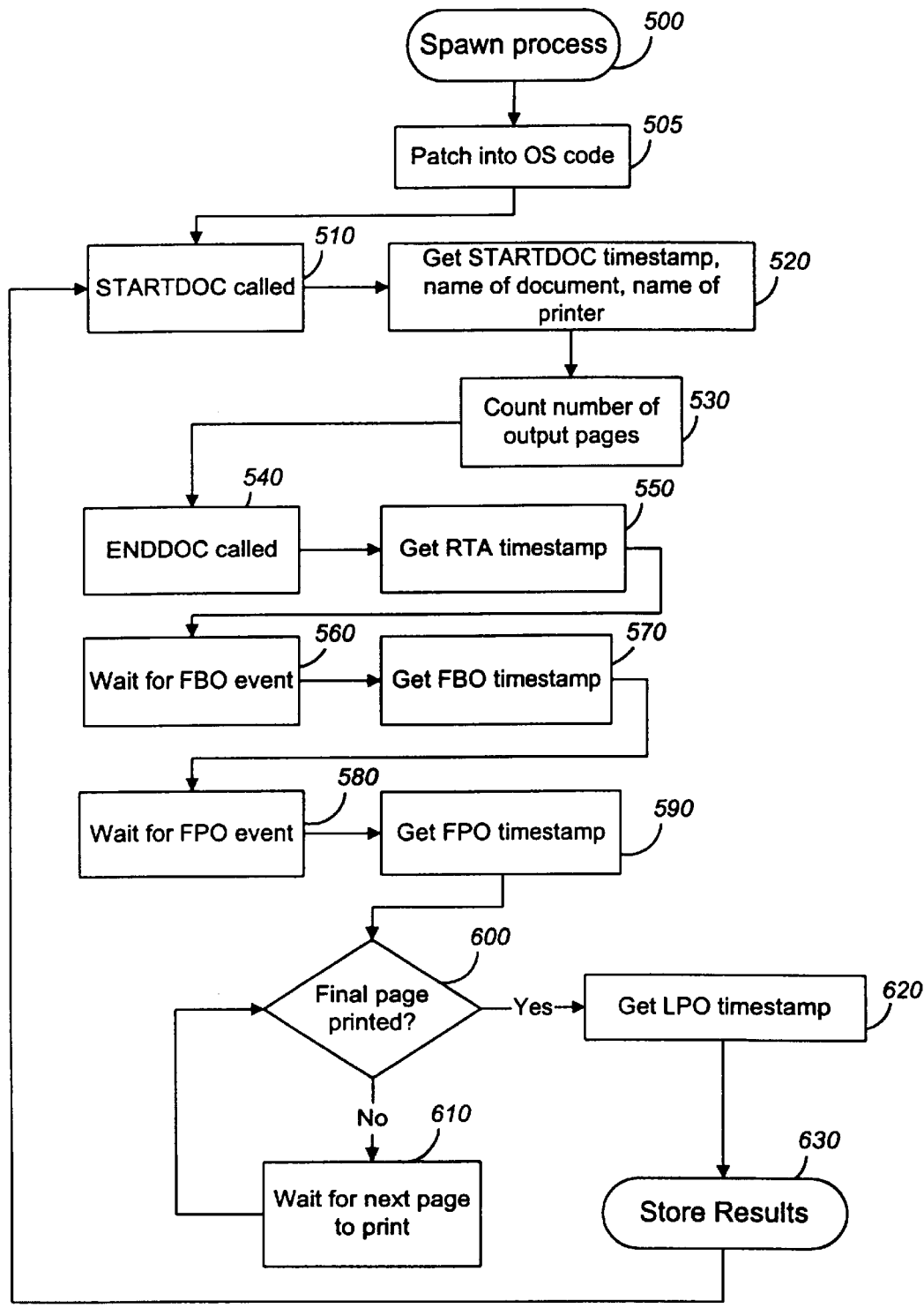
FIG._3

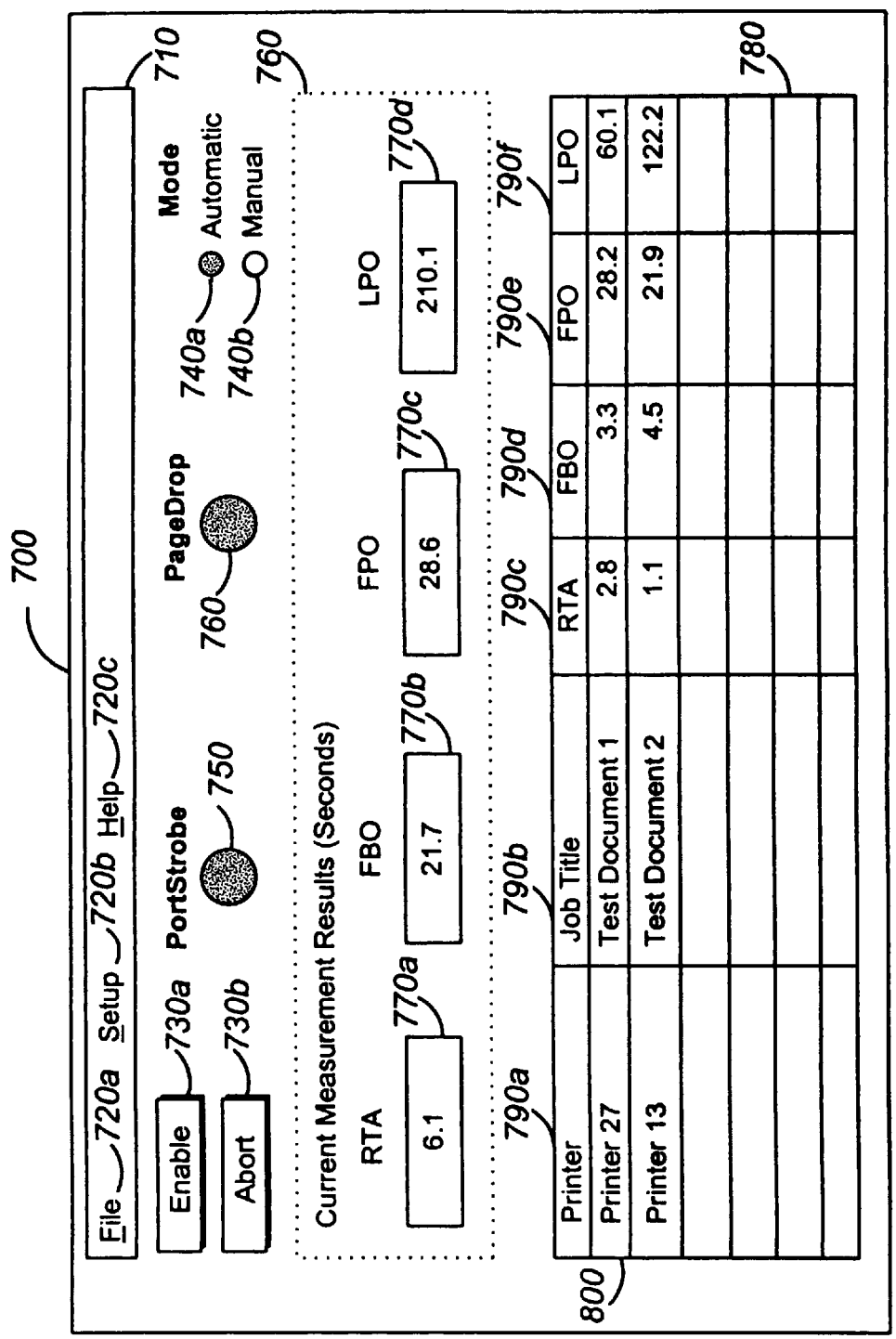
FIG._4

PRINT DATA FLOW OPERATION STANDARDIZED TEST TECHNIQUE

BACKGROUND OF THE INVENTION

The invention relates to measuring the total times elapsed during a computer print job.

Conventional printers are typically rated by their maximum throughput. Many laser printers used in homes and offices, for example, have engines rated at eight pages per minute (ppm). Such a rating indicates that the printer can output a maximum of eight pages in a minute.

An engine rating, does not, however, typically reflect the 'click to clunk' time: the total amount of time the user must wait from the time a print job is requested (by, e.g., selecting "OK" in a print dialog box) until the time that the printer prints the last page of the print job. An engine rating only measures the printer's maximum possible throughput. This maximum throughput will typically be attained only under ideal conditions and does not represent the printer's throughput under many working conditions. Most printers, for example, will only produce output at the maximum throughput for print jobs consisting of text and at most some simple graphics. To print complex graphics, significant preprocessing of the output is typically necessary. Such preprocessing can increase the click to clunk time by introducing a delay before the output of each page.

After the user requests a print job, the application program spools print data to the operating system. Typically, processing is blocked during spooling, preventing the user from using the application program. Spooling time is therefore a component of the total waiting time experienced by the user and of the click to clunk time.

After spooling is complete, printer driver or other software processes the print data before transmitting it to the destination printer. Typically, print data is not transmitted to the printer until this processing is complete. Printer driver processing time is therefore a component of the click to clunk time.

SUMMARY OF THE INVENTION

The invention provides a print data flow testing technique for measuring the 'click to clunk' time of a computer print job operation.

The invention running on the user's computer begins measuring the duration of a print job operation when the invention detects that the user has requested a print job. The invention next determines the time that the first byte of data derived from the document is transmitted from the computer to the printer. The invention completes its measurement of the duration of the print job operation when the invention detects that the last page of the document has been printed by the printer.

In one embodiment, overriding computer operating system procedures provides a means for detecting when the user has requested a print job. Another override provides a means for detecting the time when the application program completes sending print data to the computer's operating system.

One advantage of the invention is that by detecting the times at which a user request a print job and at which the application program completes sending print data to the computer's operating system, it can be used to measure the time spent by the user waiting for control of the application program. This time is also a component of the total time experienced by the user waiting for completion of the print job operation, because typically data is not sent to the printer until the application has completed sending print data to the operating system.

The invention also detects the time that data related to the document is first transmitted from the computer to the printer. In one embodiment, this detection is achieved by a detector attached to the connection between the computer and the printer. Software mechanisms may also be used to detect the transmission. Detection of this event allows the invention to measure the total time spent by the computer processing print data before sending print data to the printer.

Another advantage of the invention is that it detects the time at which each page of the print job is output from the printer. In one embodiment, an optical sensor attached near the paper output path of the printer performs this detection. Detection of the time of output of each page, in conjunction with the measurement of computer processing time, allows the invention to measure the total click to clunk time. When measurement is completed, the invention may record the results in a file.

Each of the detected times may be detected with reference to the value of the computer's CPU clock at the time of detection.

A further advantage of the invention is that measurement of print jobs is transparent to the user. The software aspect of the invention runs as a background process, and automatically measures the duration of each print job requested by the user. The operations performed by the background process incur minimal overhead costs on the operating system and therefore do not noticeably affect system performance.

A further advantage of the invention is that it can be used in conjunction with a wide variety of hardware and software configurations. An embodiment that uses an optical sensor that is mounted to the printer can work with a wide variety of printers. The invention does not require any modification to the printer hardware or printer driver software. The software aspect of the invention works solely by overriding a small number of standard operating system procedure calls. The invention is therefore transferable to a variety of operating systems.

BRIEF DESCRIPTION OF THE DRAWINGS

FIG. 1 is a block diagram representing a computer system implementing a print data flow testing technique.

FIG. 2 is a flow diagram representing a typical sequence of events which constitute the 'click to clunk' cycle of a print job measured by the print data flow testing technique.

FIG. 3 is a flow diagram of the main control logic of the print data flow testing technique.

FIG. 4 is a diagram of a dialog box allowing user configuration of program settings and displaying of status information.

DETAILED DESCRIPTION

FIG. 1 shows a computer system implementing the print data flow testing technique. A computer 100 with an operating system 130 is shown running a foreground application 140, such as a word processor or spreadsheet program. The user interacts with the computer with a keyboard 120 or other input device and receives output from the computer 100 on a monitor 110 or other output device. Printer driver software 160 for the attached printer 170 is installed. Print data flow software for measuring components of the total elapsed print job time runs as a background process 150.

An input port of the printer 170 is attached to an I/O port 210 of the computer 100 by a cable or other connection 220. The printer 170 may also be connected to the computer 100 remotely over a network, e.g., a Local Area Network (LAN) or a Wide Area Network (WAN). Optionally, a data flow detector connected between the I/O port 210 and the printer 170 is used to detect the flow of data from the computer 110 to the printer 170 and to send appropriate feedback to the computer 110 through the I/O port 230. The printer has a paper input tray 190 and a paper output tray 180.

An optical sensor 200 is attached to the printer 170 at a location where it can detect paper egressing from the print engine. The sensor 200 is connected to an I/O port 230 of the computer 100 by a cable or other connection 240. The output of the sensor 200 is a continuous one-bit signal. By default the signal is HI. When paper is in front of the sensor, the output of the sensor is LO. Sensors with different output schemes may be used, so long as sensor output can be used to detect the time of page output.

FIG. 2 is a flow diagram representing a sequence of events constituting the 'click to clunk' cycle of a print job. Note that FIG. 2 does not indicate the interaction of the print data flow process or the optical sensor with these events; such interactions are shown in FIG. 3.

Referring to FIG. 2, the user clicks on a "Print" menu choice or otherwise initiates a tentative request for a print job (step 300). Next, a print dialog box appears which allows the user to configure various print settings, such as the number of pages to print (step 310). The user then confirms the print request by clicking on an "OK" button (step 320).

Upon receiving notice of this confirmation, the application program calls a system procedure, denoted STARTDOC, indicating that the application is going to stream spool data derived from document data to the operating system (step 325). Arguments passed to the START-DOC procedure identify, e.g., a name of the document to print and the printer on which to print the document. The time at which STARTDOC is called constitutes the beginning of the 'click to clunk' cycle. Although steps 300–320 represent the typical sequence of events leading to a START-DOC call in an operating system which uses a Graphical User Interface (GUI), STARTDOC will be called after the user confirms a request to initiate a print job by any means.

The foreground application then spools the spool data to the operating system (step 330). For each page of the document, the application calls a system procedure STARTPAGE, spools the spool data to the operating system, and then calls a system procedure ENDPAGE. After the last page has been spooled, the application calls the system procedure ENDDOC (step 340). The time at which END-DOC is called is denoted the Return to Application (RTA) event, because control of the application is typically returned to the user shortly after ENDDOC is called.

Next, the printer driver derives print data from the spool data by converting the spool data into a format suitable for use by the printer (step 350). Then the printer driver begins sending print data to the printer (step 360). The time when the first byte of print data is sent to the printer is denoted the First Byte Out (FBO) event.

After some delay, the printer will print the first page of the document, denoted the First Page Out (FPO) event (step 380). The printer then prints any intermediate pages of the document (step 390). Finally, the printer prints the last page of the document, denoted the Last Page Out (LPO) event (step 400).

FIG. 3 is a flow diagram of the main control logic of the print data flow testing technique. First, the software is spawned as a background process 150 (FIG. 1) (step 500). Although this may be done manually by the user, more typically it will be done automatically by the operating system at boot time. Next, the software overrides the STARTDOC, ENDDOC, STARTPAGE, and ENDPAGE operating system procedure calls. Once these overrides are in place, each time one of the above system procedures is called, the appropriate print data flow measurement code is executed before executing the system procedure. In this way, print data spooling can be monitored transparently. The operating system overrides remain in place until aborted by a user or removed by other means. Other means for detecting events corresponding to STARTDOC, ENDDOC, STARTPAGE, and ENDPAGE may be used in place of operating system procedure call overrides.

The print data flow software overrides the STARTDOC system procedure, allowing it to obtain the time of the request and other information such as the name of the printer on which the document is being printed. The time of the request, and the times described below, may be calculated with reference to the CPU clock or with reference to any other clock or counter.

When the STARTDOC system procedure is called (step 510), control is passed to the appropriate override code described above. The override code uses the CPU clock to obtain and record a STARTDOC time stamp, and to obtain a name of the document to print and a name of the destination printer (step 520). Control is then returned to the system STARTDOC procedure. Using the STARTPAGE, ENDPAGE, and ENDDOC overrides, the method counts the number of pages in the document (step 530). When the application calls ENDDOC, the appropriate override code obtains and records the current CPU clock time as the time of the RTA event (step 550).

Next, the method waits for the FBO event (step 560). The FBO event may be detected by an operating system mechanism provided specifically for this purpose. However, other methods for detecting the FBO may be used, including using a detector 215 connected between the computer's I/O port 210 and the printer 170. The detector detects when data is being transmitted from the computer to the printer. When the FBO event is detected, the CPU clock is used to record the time at which it occurs (step 570).

The method polls the sensor 200, and uses the sensor output to detect the FPO event (step 580). A sensor output transition from HI to LO indicates that a page has begun printing. A sensor output transition from LO to HI indicates that a page has completed printing. The print data flow software can be configured to use either a HI-LO (start of page) or a LO-HI (end of page) transition as an indication of page output. When the FPO event is detected, the CPU clock is used to record the time at which it occurs (step 590).

Zero or more pages of the document will be printed after the first page is printed. The method uses the page count obtained in step 530 to decide when to stop counting pages (step 600). The process 150 continues to poll the sensor output until the last page is printed (steps 600, 610). When the LPO event is detected, the CPU clock is used to record the time at which it occurs (step 620).

After the document has been printed, the method stores the data which it has accumulated in local memory, in a file, or on some other storage medium (step 630). The data which is stored typically includes the name of the printer to which the file was printed, the name of the document printed, the date when the test was performed, the total click to clunk time, and the time stamps of the RTA, FBO, FPO, and LPO events. The click to clunk time is the difference between the time stamps of the STARTDOC and LPO events.

FIG. 4 is a diagram of a dialog box 700 used by the print data flow software to allow user configuration of program settings and to display status information. A menu bar 710 contains menu headings 720a–c. The polling interval, which determines the frequency at which the software polls the sensor 200 output, is set through a menu choice under one of the menu headings 720a–c. The default polling interval is 200 milliseconds. Longer polling intervals may be used in conjunction with slower printers to decrease the load imposed on the system software by the print data flow background process 150. The name of the file in which print job measurement results are stored is set through a menu choice under one of the menu headings 720a–c. A menu choice under one of the menu headings 720a–c is used to indicate to which I/O port 230 the sensor 200 is connected.

Print job measurement is enabled by selecting one button 730a and disabled by selecting another button 730b. The software may be configured to run either in automatic mode by selecting one button 740a or in manual mode by selecting another button 740b. In automatic mode, all steps of the method shown in FIG. 3 are performed automatically without human intervention. In manual mode, the method detects and records the time of the RTA event, but the user indicates each of the FPO and LPO events by clicking on an on-screen button at the appropriate time. Manual mode may be used to measure print times without use of a sensor 200. When in manual mode, however, the method does not detect the FBO event.

A region 750 visually indicates whether data is currently being transmitted from the computer 100 to the printer 170 by use of one color to indicate transmission and use of a distinct color to indicate lack of transmission. Another region 760 visually indicates whether paper is currently being printed by the printer 170 by use of one color indicate printing and use of a distinct color to indicate lack of printing.

A region 760 contains measurement information for the current print job. Sub-regions 770a–d contain measurements of the RTA 770a, FBO 770b, FPO 770c, and LPO 770d of the current print job.

A table displays measurement information for all print jobs measured. The table has columns 790a–f for a printer name 790a, job title 790b, RTA 790c, FBO 790d, FPO 790e, and LPO 790f for each print job. Each row 800 of the table 780 contains measurements for a single print job.

Results of print data flow measurements may be output to any output device such as a monitor 110 or a printer 170, or stored on any storage medium such as a floppy disk, a fixed hard disk, a removable hard disk, or a tape.

Although part of the invention is described in terms of a software implementation, the invention may be implemented in software or hardware or firmware, or a combination of the three.

The present invention has been described in terms of an embodiment. The invention, however, is not limited to the embodiment depicted and described. Rather, the scope of the invention is defined by the claims.

What is claimed is:

1. A method for testing print data flow comprising:
   overriding a STARTDOC operating system call with a STARTDOC override, the STARTDOC override comprising print data flow measurement code operable to determine a STARTDOC time;
   determining the STARTDOC time by executing the STARTDOC override in response to a user request to an application program running on a computer to print a document to a printer, the STARTDOC time being the time of the user request;
   determining an FBO time, the FBO time being the time that the first byte of print data derived from the document is transmitted from the computer to the printer; and
   determining an LPO time, the LPO time being the time that the last page of the document is output from the printer.

2. The method of claim 1, further comprising:
   recording at least one of the determined times.

3. The method of claim 1, further comprising:
   recording the elapsed time from the STARTDOC time to the LPO time.

4. The method of claim 1, wherein determining the FBO time comprises:
   monitoring the flow of derived data from the computer to the printer for the first byte of print data.

5. The method of claim 4, wherein:
   the monitoring comprises obtaining the time of an occurrence of an operating system event or procedure call corresponding to the first byte of print data and calculating the FBO time from the time of the corresponding occurrence.

6. A method comprising:
   determining a STARTDOC time, the STARTDOC time being the tine of a user request to an application program running on a computer to print a document to printer;
   determining an FBO time, the FBO time being the time that the first byte of print data derived from the document is transmitted from the computer to the printer, by monitoring the flow of derived data from the computer to the printer for the first byte of print data, the monitoring comprising using a detector monitoring the flow of data from the computer to the printer; and
   determining an LPO time that the last page of the document is output from the printer.

7. A method comprising:
   determining a STARTDOC time, the STARTDOC time being the time of a user request to an application program running on a computer to print a document to a printer;
   determining an FBO time, the FBO time being the time that the first byte of print data derived from the document is transmitted from the computer to the printer; and
   determining an LPO time that the last page of the document is output from the printer by:
      using a sensor to detect the motion of the last page of the document output from the printer;
      obtaining the time of the detection; and
      calculating the LPO time from the time of the detection.

8. The method of claim 7, wherein:
   the sensor is an optical sensor located so that paper being output from the printer passes through an area sensed by the sensor.

9. A method comprising:
   determining a STARTDOC time, the STARTDOC time being the time of a user request to an application program running on a computer to print a document to a printer;
   detecting an RTA time when the application program completes sending spool data derived from the document to an operating system of the computer;

determining an FBO time, the FBO time being the time that the first byte of print data derived from the document is transmitted from the computer to the printer; and determining an LPO time, the LPO time being the time that the last page of the document is output from the printer.

10. The method of claim 9, wherein:

determining the RTA time comprises obtaining the time of a corresponding occurrence of an operating system event or procedure call and calculating the RTA time from the time of the corresponding occurrence.

11. A method comprising:

determining a STARTDOC time by obtaining the time of an occurrence of an operating system event or procedure call corresponding to the time of a user request to an application program running on a computer to print a document to a printer, and calculating the STARTDOC time from the time of the corresponding occurrence;

determining an RTA time by obtaining the time of an occurrence of an operating system event or procedure call corresponding to the time when the application program completes sending spool data derived from the document to an operating system of the computer, and calculating the RTA time from the time of the corresponding occurrence;

determining an FBO time by obtaining the time of an occurrence of an operating system event or procedure call corresponding to the time when the first byte of print data derived from the spool data is transmitted from the computer to the printer, and calculating the FBO time from the time of the corresponding occurrence; and detecting an LPO time by using a sensor to detect the motion of the last page of the document printed by the printer, obtaining the time of the detection, and calculating the LPO time from the time of the detection.

12. A system for testing print data flow comprising:

a computer;

a printer in communication with the computer;

computer program instructions configuring the computer to override a STARTDOC operating system call with a STARTDOC override the STARTDOC override comprising print data flow measurement code operable to determine a STARTDOC time;

computer program instructions configuring the computer to determine a STARTDOC time by executing the STARTDOC override in response to a user request to an application program running on a computer to print a document to a printer, the STARTDOC time being the time of the user request; and means for determining an LPO time, the LPO time being the time that the last page of the document is output from the printer.

13. The system of claim 12, further comprising:

means for determining an FBO time, the FRO time being the time that the first byte of print data derived from the document is transmitted from the computer to the printer.

14. A system comprising:

means for determining a STARTDOC time, comprising means for obtaining the time of an occurrence of an operating system event or procedure call corresponding to the time of a user request to print to a printer a document of an application program running on a computer, and calculating the STARTDOC time from the time of the corresponding occurrence;

means for determining an RTA time, comprising means for obtaining the time of an occurrence of an operating system event or procedure call corresponding to the time when the application program completes sending spool data derived from the document to an operating system of the computer, and calculating the RTA time from the time of the corresponding occurrence;

means for determining an FBO time, comprising means for obtaining the time of an occurrence of an operating system event or procedure call corresponding to the time when the first byte of print data derived from the spool data is transmitted from the computer to the printer, and calculating the FBO time from the time of the corresponding occurrence; and means for detecting an LPO time, comprising means for using a sensor to detect the motion of the last page of the document printed by the printer, obtaining the time of the detection, and calculating the LPO time from the time of the detection.

15. Apparatus for measuring the time elapsed printing a document from a computer to a printer, comprising:

a sensor configured to attach to a printer so that pages printed by the printer are sensed by the sensor, the sensor operating to transmit data to an input port of a computer;

a detector operating to detect output from the computer to the printer and configured to be coupled to a communication link from the computer to the printer; and a computer program comprising instructions configuring the computer to calculate a time stamp based on output from the sensor and configuring the computer to calculate a time stamp based on output from the detector.

16. A computer program for testing print data flow, the computer program residing on a computer-readable medium, comprising computer-readable instructions for causing a computer to:

override a STARTDOC operating system call with a STARTDOC override the STARTDOC override comprising print data flow measurement code operable to determine a STARTDOC time;

determine the STARTDOC time by executing the STARTDOC override in response to a user request to an application program running on a computer to print a document to a printer the STARTDOC time being the time of the user request;

determine an FBO time, the FBO time being the time that the first byte of print data derived from the document is transmitted from the computer to the printer; and determine an LPO time, the LPO time being the time that the last page of the document is output from the printer.

17. The method of claim 1, wherein determining at least one of the STARTDOC time, FBO time or LPO time comprises:

using a CPU clock to obtain and record the at least one of the STARTDOC time, FBO time or LPO time.

* * * * *